United States Patent [19]

Leddet

[11] 4,453,303
[45] Jun. 12, 1984

[54] DEVICE AND PROCESS FOR AUTOMATIC SETTING OF A WINDOW ELEMENT, HEADLINING OR THE LIKE

[75] Inventor: Philippe Leddet, Villepreux, France
[73] Assignee: Regie Nationale des Usines Renault, Boulogne-Billancourt, France
[21] Appl. No.: 402,272
[22] Filed: Jul. 27, 1982
[30] Foreign Application Priority Data Aug. 6, 1981 [FR] France ................................ 81 15266

[51] Int. Cl.³ ..................... B23Q 17/00; B23D 21/00; B65G 43/00
[52] U.S. Cl. ...................................... 29/407; 29/701; 198/341
[58] Field of Search ................. 29/701, 430, 431, 407; 198/341; 414/5, 728, 729, 730, 750, 751, 752

[56] References Cited
U.S. PATENT DOCUMENTS 3,283,918 11/1966 Deval .................................. 198/341
4,086,522 4/1978 Engelberger et al. .............. 198/341
4,135,619 1/1979 Cerboni .............................. 414/752
4,299,533 11/1981 Ohnaka .............................. 414/752

FOREIGN PATENT DOCUMENTS 1419065 11/1964 France .
2086842 4/1970 France .

Primary Examiner—Howard N. Goldberg
Assistant Examiner—Steven E. Nichols
Attorney, Agent, or Firm—Oblon, Fisher, Spivak, McClelland & Maier

[57] ABSTRACT

A device is disclosed for automatic setting of a window element or headliner, particularly onto a vehicle body disposed on a support connected to a conveyor line. A movable setting tool is equipped with means for retaining said element and sensors for detecting the proximity of the vehicle body and particularly the frame to receive said element. The sensors send, possibly by processing means, control signals to drive means of said tool, in order to position the tool correctly with respect to the body onto which is rests.

10 Claims, 7 Drawing Figures

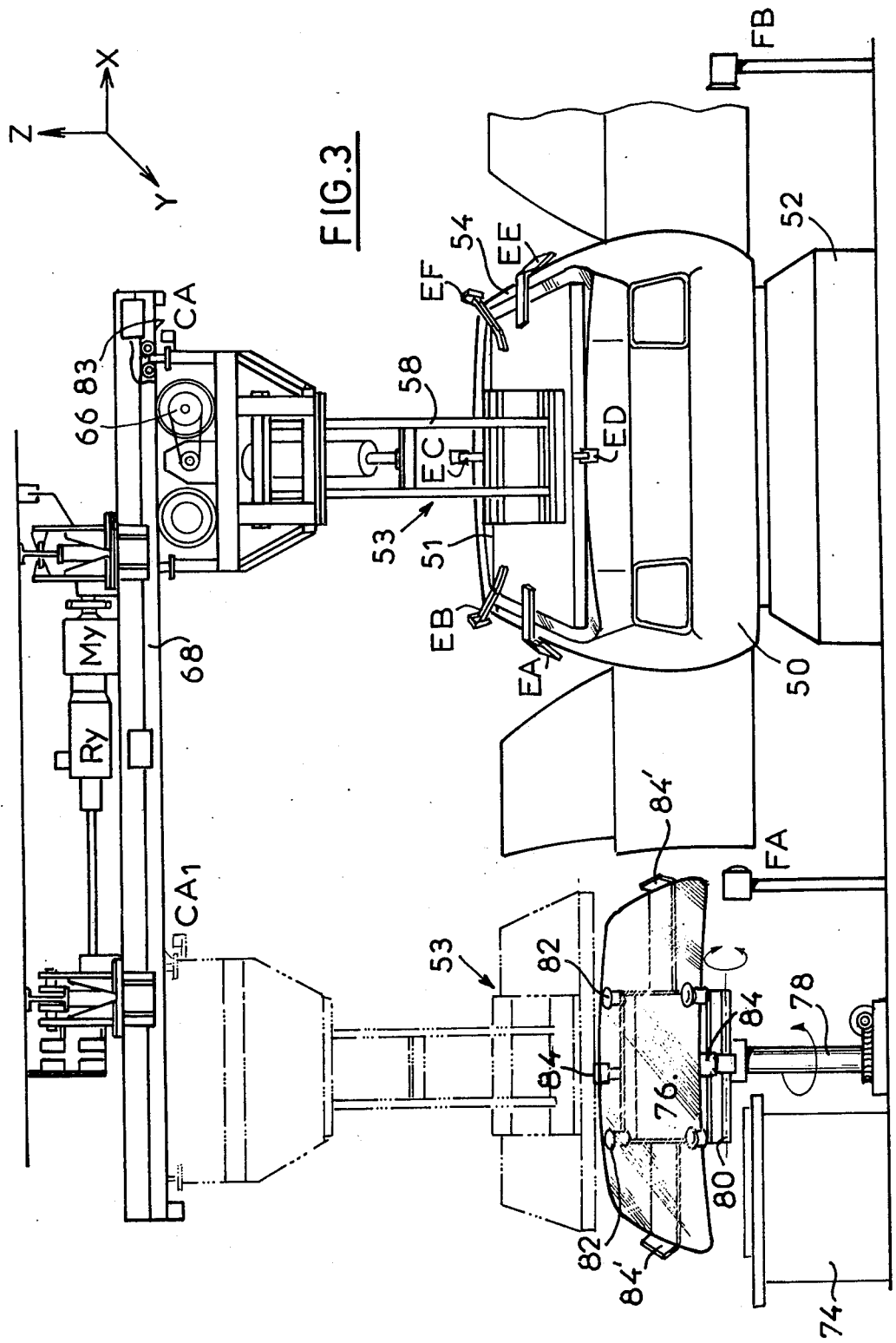

DEVICE AND PROCESS FOR AUTOMATIC SETTING OF A WINDOW ELEMENT, HEADLINING OR THE LIKE

BACKGROUND OF THE INVENTION

1. Field of the Invention

This invention relates to a process and device for automatic setting of a window element such as a windshield, a back-window, a headliner or the like.

2. Description of the Prior Art

Handling robots are already known in which a prehensile tool grips an object placed in loading position to convey it to a setting position.

Such an operation requires a very precise spatial localization of the loading and setting points.

SUMMARY OF THE INVENTION

On an automobile assembly line, these conditions are never met, particularly as far as the setting point is concerned, and meeting them might entail either an unacceptable decrease in production speed, or the installation of numerous handling robots requiring costly investment. This invention aims at eliminating these drawbacks, in particular by proposing a device which increases productivity by enabling automatic mounting of a window element or headliner, particularly on the body of a vehicle placed on a support connected to a conveyor line. The invention includes a mobile setting tool equipped with means for retaining said element and with sensors for detecting the proximity of the vehicle body, particularly the frame which is to receive said element, and sending, possibly through processing means, control signals to the drive means of said tool so as to position it correctly with respect to the body onto which the element is to be positioned, using hanging arms to achieve the setting operation.

Thus, by providing the gripping and setting tool with means for "perceiving" the object to be gripped or the support which is to receive the object, a robot capable of working within a sphere of uncertainty is achieved.

According to one characteristic of the invention, the setting tool is mounted on a suspended carrier cooperating with the drive means, enabling it to move either in parallel or transversally with respect to the assembly line.

According to another characteristic of the invention, the tool includes sensors which send signals of relative "tool-body" position, preferably along three orthogonal directions connected to the tool.

This invention also relates to a process of automatic searching for reference points, particularly for the automatic setting of a window element, headliner or the like, onto the body of a vehicle disposed on a support connected to a conveyor line. This process consists of providing the movable setting tool with means for retaining said element, and with sensors for detecting the proximity of the body, and particularly the frame which is to receive the element, processing the signals sent by said sensors, positioning said tool with respect to the body with drive means controlled by the signals thus processed. The above assures the mechanical cooperation of the body and tool, and the setting of the window element in the above mentioned frame.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIG. 3 shows in front view, the device for automatically setting a window element on an assembly line;

DETAILED DESCRIPTION OF THE PREFERRED EMBODIMENTS

Figure 1:
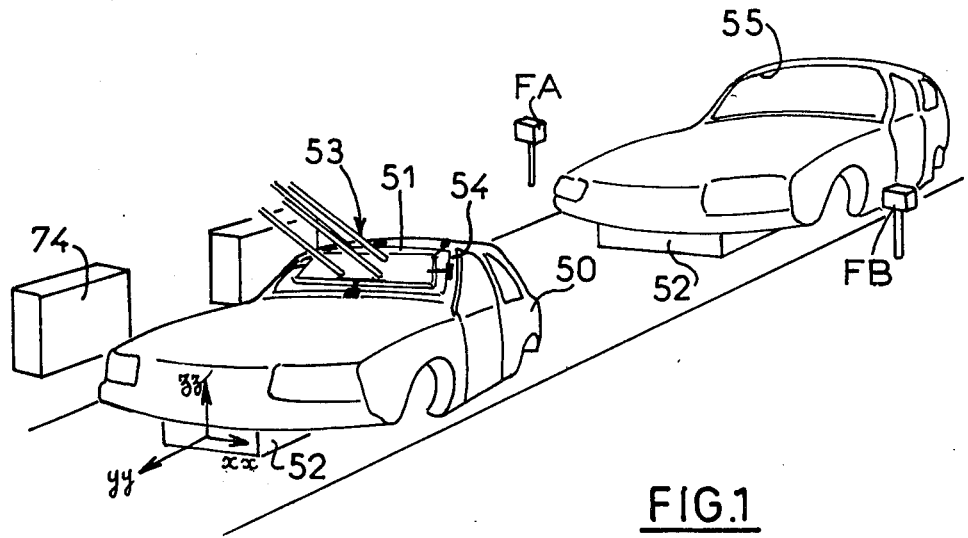
FIG. 1 is a schematic illustration of the automatic reference search process applied to the automatic mounting of a window element onto the body of a vehicle.

FIG. 1 shows a body 50 of an automobile which is set, for example on a platform 52 of a conveyor line moving at speed V1 measured by a tachometric dynamo (not shown), and onto which a window element such as windshield 51 is to be mounted.

Figure 2:
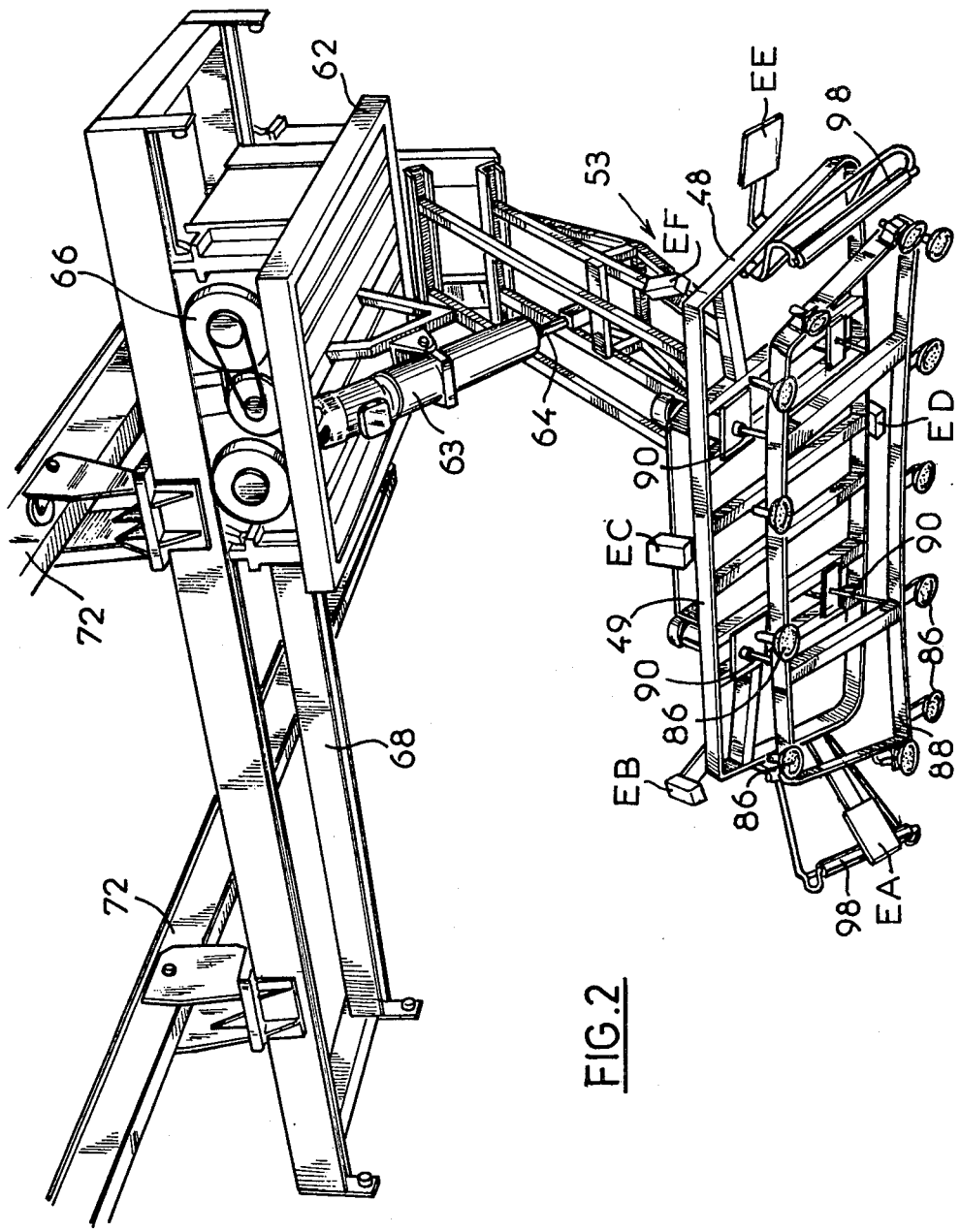
FIG. 2 shows in perspective a gripping and setting tool for a window element.

According to the invention, mobile setting tool 53, as shown in perspective in FIG. 2, includes a group of relative position sensors having at least two essentially horizontal proximity sensors EC,ED disposed on transverse sides 49 of the tool and designed to measure its distance with respect to body 50' along a vertical axis zz, particularly with regard to that portion of the body which delimits frame 55 for receiving the window element. A pair (EA,EE) or if need be two pairs, of sensors (EA,EE) and (EB,EF) of different or equal sensitivity, are mounted on longitudinal sides 48 of the tool body so that the active side of each sensor may be slightly inclined with respect to the tool plane, and essentially parallel to posts 54 delimiting the frame 55.

The various signals sent by the sensors (which will each be designated by the same reference as that of the sensor from which they are produced) are processed by means of analog and digital computing circuits, not shown, in order to provide relative positions for the tool and body with regard to a frame of reference oxyz connected to the body.

Thus the signal EC+ED/2 measures the average relative position of the tool along vertical axis zz, signals (EA+EE)/2 and (EB+EF)/2 measure the average relative orientation of the tool to the body, in approach and in position, respectively, along longitudinal axis yy; while signals (EA−EE) and (EB−EF) give, along transverse axis xx, the centering error in approach and in position, respectively.

The movement of the tool, along each axis mentioned above, is provided by drive means comprising a motor controlled by the signals previously processed and provided by the sensors detecting the relative tool-body movement in the direction being considered.

Figure 4:
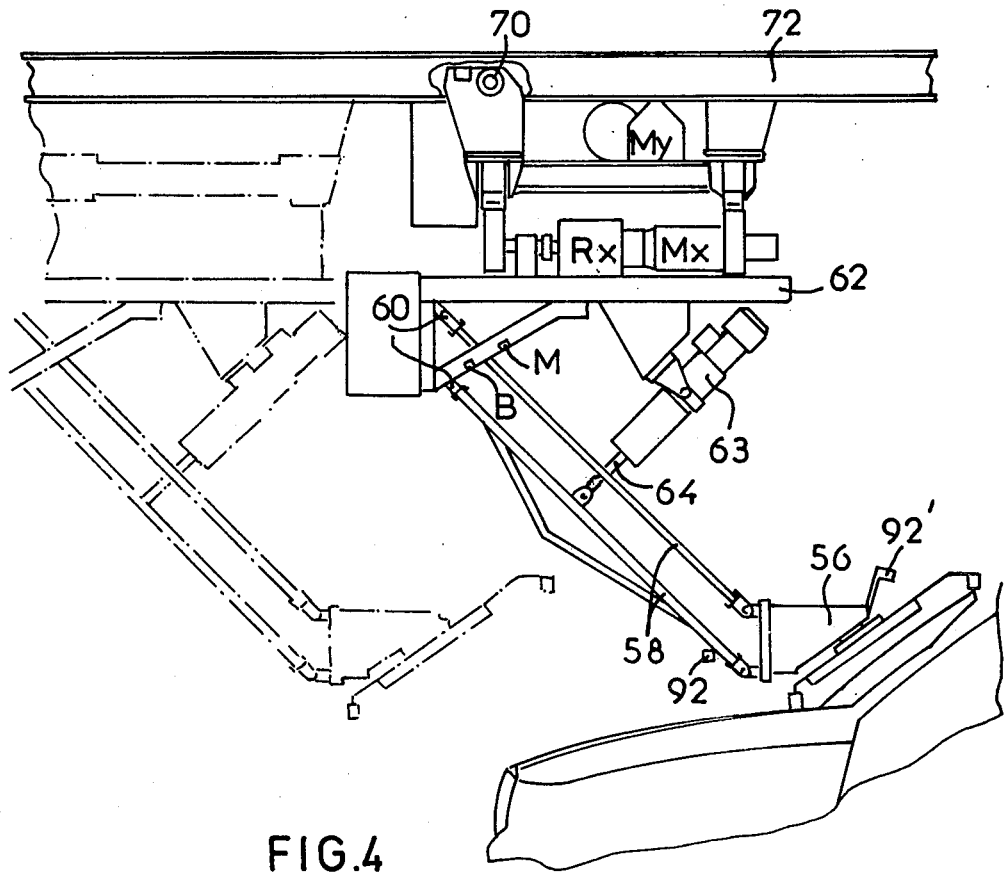
FIG. 4 shows a portion of the device of FIG. 3 in side view.

FIGS. 3 and 4 show a gripping and setting device according to the invention, comprising mobile tool 53 and its sensors, connected to a support 56 located at the lower end of frame 58 whose upper end is articulated about two horizontal axes 60 linked to a carrier 62 onto which a piston 63 is mounted. Piston rod 64 of piston 63 is connected to said frame in order to assure vertical displacement between two extreme positions sensed by proximity detectors M and B.

The carrier 62 is mounted on wheels 66 driven by a motor Mx and a reducer Rx, on the tracks of a transverse cradle 68, allowing the carrier to position itself on, or more transversely away from, longitudinal axis YY of the line, thus forming part of absolute frame of reference XYZ, parallel to oxyz. The carrier 62 is also suspended by means of rollers 70 on longitudinal tracks 72 along which it may move parallel to the conveyor line by drive means including a motor My and a reducer Ry. The motors Mx, My are preferably d.c. motors having a variable speed control system.

The automatic mounting of a window element, for example, is achieved as follows:

With the carrier in a waiting position, generally set apart from the line, the carrier is set on a turning table 74 having a set of stops. The windshield 51 rests on an adjacent frame 76 which rotates about vertical shaft 78 and is capable of tilting about horizontal shaft 80, thus allowing the windshield to be gripped and turned to face the tool by means of a set of suction cups 82 connected to a pneumatic circuit (not shown here) connected in such a way as to create and maintain suction while the windshield is on said frame.

The correct positioning of the windshield on frame 76 controls the movement of the carrier 62, which leaves its waiting position to proceed parallel to axis YY of the line. The carrier 62 positions itself, using a longitudinal position detector (not shown here), placed on track 72 and acting on motor My, directly above the loading point, located alongside the line. The loading point consists of the turning table and its above-mentioned frame which includes, in addition to suction-cups 82, a group of metal stops 84, 84′, distributed along its periphery, two of which are movable in order to grip or release the windshield during the windshield loading or unloading operation, and come into contact with the edge of the windshield between these two operations.

With the carrier in this position, the tool begins a rapid descent controlled by piston 63 followed by a longitudinal and lateral self-centering by means of the interaction of the proximity sensor (previously described) with metal stops 84, 84′, according to a sequence described later in connection with the setting of the windshield in the frame of the body. The tool, in correct position, then grips the windshield by a set of suction cups 86 distributed over a frame 88. The frame 88 is moved by a group of pistons 90 mounted on the tool-body, and is connected to a pneumatic circuit that creates a suction in cups 86, which holds the window element until it is set.

The tool is then moved rapidly upward by means of piston 63, and then is returned to a waiting position.

Figure 5:
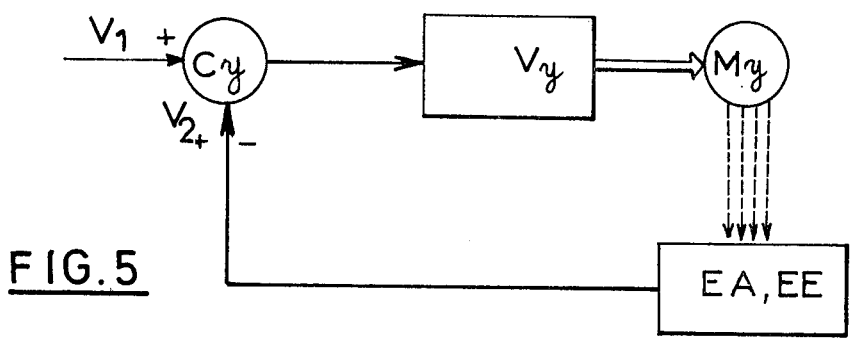
FIGS. 5 to 7 show diagrams of various controls used in the automatic setting operation.

A photoelectric cell (FA,FB) placed on the line detects the approach of body 50 and controls transverse displacement of the carrier 62 which positions itself, by means of a proximity detector CA, mounted on said carrier 62, and of a cam 82, along axis YY of the line. The carrier proceeds rapidly by means of motor My in the direction of the above-mentioned body, whose proximity is detected by a first optical sensor 92 connected to the tool. The sensing by sensor 92 causes the stopping of the tool's longitudinal movement. By means of a second optical sensor 92′ on the frame, the frame shifts toward the opposite direction at a relatively slow motion, slightly less than that of the line, allowing it to slowly approach the body which at a certain moment is situated within the field of one of the proximity detectors (EA,EE) or (EB,EF). The speed of the tool is then changed to that of the line by means of a circuit whose diagram is shown on FIG. 5. Longitudinal displacement motor My is directed by a speed variator Vy, itself controlled by a comparator Cy, a first input of which receives the speed measurement of line V1, and a second input of which receives the correction signal V2 sent by analog proximity sensors EA and EE. Meanwhile the proper relative vertical positioning is achieved under the action of signal (EC+ED), commanding the piston 63. The trasnverse position, and if need by, the approach of the tool is controlled by action of signals (EA−EE) and (EB−EF) commanding motor Mx.

Figure 6:
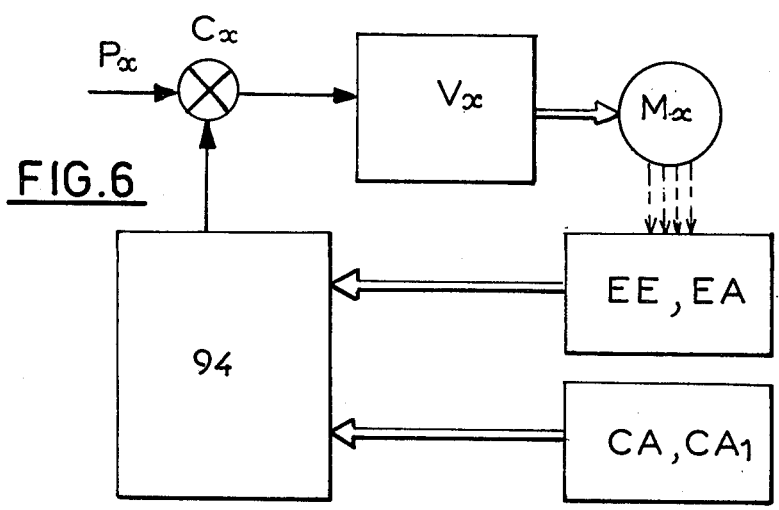

FIG. 6 is a diagram of the circuit for setting the d.c. motor Mx transverse position, which moves the tool mounted on the carrier in the x direction. The position of the tool in said direction is detected by absolute reference proximity detectors such as CA and CA1 defining the line axis and the lateral position of the turning table, respectively, and whose signals are sent through a switching sensor-detector unit 94 to a comparator Cx. A command position value Px is fed into comparator Cx. Unit 94 sends an error signal for control of the speed variator Vx of motor Mx to bring the carrier into desired position with regard to the conveyor line. Alternatively, analog sensors of relative position of the tool with respect to the body and mounted on the tool, such as EA,EE, can be used in a way to eliminate the centering error by use of a similar loop acting on the same speed variator to control the same motor by the detector-sensor sequence.

Figure 7:
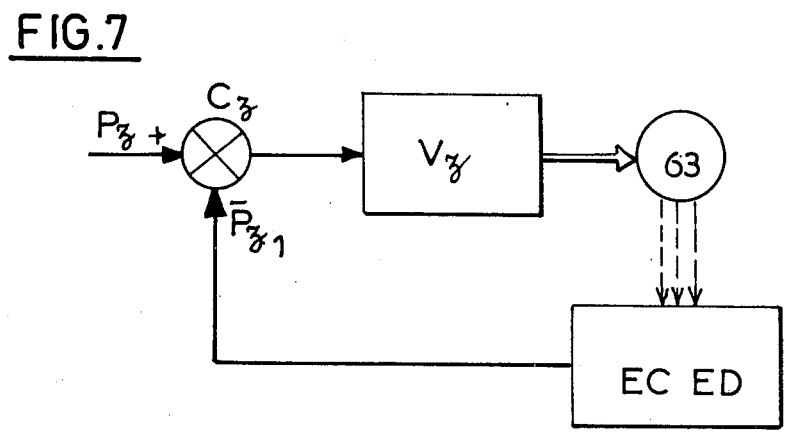

FIG. 7 shows a diagram of the circuit for positioning the tool in the vertical direction by means of auto-piston 63 controlled through a variator Vz and a comparator Cz. A height position command Pz, and signal Pz1, a function of EC+ED, are fed into the comparator Cz.

Once the correct relative positioning measured by the tool sensors is obtained, pneumatic pistons mounted on the tool move foward hanging arms 98 into locking engagement with the frame of the body. The windshield is then applied inside the frame by action of the four pistons 90. The tool is maintained in this position, at least for bonded windshields, for a period of time T during which a carrier-body pause circuit controls the tool, and at the end of which the pneumatic central control (not shown here) allows suction cups 86 to release the windshield.

The mounting operation thus finished, the pneumatic central control assures the release of the arms 98 and the withdrawal of pistons 90 setting the windshield, to allow the tool to go back rapidly to an initial waiting position so as to start the above-described cycle again.

The centering here described also applies to the tool gripping operation when the windshield is disposed on the frame of the turning table, an operation whose sequence is simplified by the fact that the loading point is motionless.

Of course the process and device according to this invention are not limited to the mounting of a windshield, but can be applied to the mounting onto a body or any other unit, of any element symmetric to the longitudinal axis of the latter, such as for example, a back-window or a headliner.

The process can also extend to handling robots with automatic reference searching using rotations; in fact by substituting sensors EC,ED with two pairs (EC,ED)

(EC)′, (ED)′ disposed symmetrically to the longitudinal plane of the tool, it is possible to obtain, by means of processing values:

(EC−ED)+((EC)′−(ED)′)
(ED−(ED)′)+(EC−(EC)′)

the rotating error about transverse and longitudinal axes respectively.

Value (EA−EE) also gives, in case of a correct transverse positioning, the rotating error about the vertical axis.

This can apply in particular to the setting of roof molding, for example, such setting requires a good longitudinal orientation of the latter. In fact the use of two pairs of sensors (EB−EF) and (EA−EE), disposed on the tool longitudinal sides, allows one to obtain, through computing of values:

(EB−EF)−(EA−EE) and
(EB−EF)+(EA−EE), the rotating error about axis zz and the transverse error along xx, respectively.

The sequence previously described can be achieved either by means of traditional technique using relays or, preferably, by means of a programmable robot or computer.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for the automatic setting of an element onto an automobile body mounted on a conveyor line and including a frame for said element, said apparatus comprising:
   a movable setting tool;
   drive means for moving said tool in at least two orthogonal directions;
   first sensor means on said tool for detecting the proximity of said body;
   holder means on said tool for gripping said element;
   hanging means on said tool for holding said body frame; and
   signal processing means for receiving signals from said first sensor means and controlling said drive means as a function of said signals.

2. The apparatus of claim 1 wherein said at least two directions comprise horizontal directions parallel and transverse to said conveyor line, and including suspended carrier means movable in said transverse and parallel directions and supporting said setting tool.

3. The apparatus of claim 2 wherein said at least two directions include a third vertical direction and wherein said tool is connected to said carrier via a first frame, said apparatus including a piston and cylinder mounted on said first frame for moving said tool in said vertical direction.

4. The apparatus of claim 1 wherein said holder means comprise selectively actuatable suction cups.

5. The apparatus of claim 3 including second sensor means mounted on said carrier and said first frame for respectively detecting the end positions of said carrier and said first frame in said orthogonal directions.

6. The apparatus of claim 5 wherein said drive means and signal processing means comprise:
   a transverse direction displacement motor driving said carrier;
   a first speed variator controlling said transverse direction motor;
   first comparator means receiving signals from at least one of said first and second sensor means and controlling said first variator.

7. The apparatus of claim 5 wherein said drive means and signal processing means comprise:
   a longitudinal direction displacement motor driving said carrier;
   a second speed variator controlling said longitudinal direction motor;
   a second comparator means receiving signals from said first sensor means and from third sensor means measuring the speed of said conveyor line, said second comparator controlling said second variator.

8. The apparatus of claim 1 including a second frame movably positioned on said setting tool, said holder means being positioned on said second frame, and further including second piston and cylinder means for moving said second frame relative to said setting tool.

9. The apparatus of claim 1 including third piston and cylinder means for moving said hanging means.

10. A process for the automatic setting of an element onto a vehicle body disposed on a support connected to a conveyor line, said process comprising:
   equipping a movable setting tool with means for retaining said element and sensors for detecting the proximity of said body;
   processing signals sent by said sensors;
   positioning said tool with respect to the body by drive means controlled by signals from said sensors, thereby assuring the mechanical cooperation of body and tool; and
   setting said element in said body.

* * * * *